(12) United States Patent
Moraru et al.

(10) Patent No.: US 11,219,977 B2
(45) Date of Patent: Jan. 11, 2022

(54) MACHINE TOOL, IN PARTICULAR FOR DRILLING

(71) Applicants: AMVALOR, Paris (FR); ADVANCED ENGINEERING & INNOVATION, Malaga (ES)

(72) Inventors: Georges Moraru, Aix-en-Provence (FR); Didier Frangeard, Malaga (ES)

(73) Assignees: AMVALOR, Paris (FR); ADVANCED ENGINEERING & INNOVATION, Malaga (ES)

( * ) Notice: Subject to any disclaimer, the term of this patent is extended or adjusted under 35 U.S.C. 154(b) by 0 days.

(21) Appl. No.: 15/126,864

(22) PCT Filed: Mar. 20, 2015

(86) PCT No.: PCT/EP2015/056021
§ 371 (c)(1),
(2) Date: Sep. 16, 2016

(87) PCT Pub. No.: WO2015/140334
PCT Pub. Date: Sep. 24, 2015

(65) Prior Publication Data
US 2017/0095897 A1    Apr. 6, 2017

(30) Foreign Application Priority Data

Mar. 20, 2014 (FR) ...................... 1452350

(51) Int. Cl.
B23B 39/00    (2006.01)
B23Q 15/013   (2006.01)
(Continued)

(52) U.S. Cl.
CPC .............. B23Q 5/326 (2013.01); B23B 39/00 (2013.01); B23Q 5/10 (2013.01); B23Q 5/28 (2013.01);
(Continued)

(58) Field of Classification Search
CPC .. B23B 39/00; B23Q 15/0075; B23Q 15/013; B23Q 15/08; B23Q 5/10; B23Q 5/28; B23Q 5/326; G05B 19/182; B25B 23/14
(Continued)

(56) References Cited

U.S. PATENT DOCUMENTS 2,768,539 A * 10/1956 Wollenhaupt .......... B23Q 15/00
173/19
3,505,831 A *  4/1970 Beach ...................... F16C 1/06
464/173

(Continued)

FOREIGN PATENT DOCUMENTS

FR    2 892 959 A1    5/2007
GB    2 218 268 A    11/1989

*Primary Examiner* — Robert F Long
(74) *Attorney, Agent, or Firm* — Muncy, Geissler, Olds & Lowe, P.C.

(57) ABSTRACT

Machining tool comprising a frame in which a drive shaft for a tool is mounted so as to pivot about a rotation axis and to move axially along the rotation axis. The shaft is connected to two rotary motors, namely a first motor connected to a member for meshing with a fluted portion of the shaft in order to drive the shaft in rotation and a second motor connected to a nut engaged with a threaded portion of the shaft in order to move the shaft axially. The motors are connected to at least one control unit designed to control the motors independently of one another, and the first motor and the second motor are coaxial with one another.

13 Claims, 3 Drawing Sheets

(51) Int. Cl.
  *G05B 19/18* (2006.01)
  *B23Q 5/32* (2006.01)
  *F16H 25/20* (2006.01)
  *H02K 7/06* (2006.01)
  *B23Q 5/40* (2006.01)
  *B23Q 5/10* (2006.01)
  *B23Q 5/28* (2006.01)
  *B23Q 15/007* (2006.01)
  *B23Q 15/08* (2006.01)
  *H02K 7/14* (2006.01)

(52) U.S. Cl.
  CPC ......... *B23Q 5/402* (2013.01); *B23Q 15/0075* (2013.01); *B23Q 15/013* (2013.01); *B23Q 15/08* (2013.01); *F16H 25/2018* (2013.01); *G05B 19/182* (2013.01); *H02K 7/06* (2013.01); *F16H 2025/2078* (2013.01); *F16H 2025/2084* (2013.01); *F16H 2025/2093* (2013.01); *G05B 2219/37598* (2013.01); *G05B 2219/45129* (2013.01); *H02K 7/145* (2013.01)

(58) Field of Classification Search
  USPC ....... 173/1–2, 11, 13–17, 90, 114, 131, 135, 173/198, 200–201, 206–207; 227/51, 66, 227/130
  See application file for complete search history.

(56) References Cited

U.S. PATENT DOCUMENTS

| | | | | |
|---|---|---|---|---|
| 3,724,561 A * | 4/1973 | Merrels | ............ | B25F 3/00 173/50 |
| 3,741,315 A * | 6/1973 | Hilton | ............ | E21B 7/24 173/105 |
| 3,759,336 A * | 9/1973 | Marcovitz | ............ | B23B 31/10 173/170 |
| 3,852,884 A * | 12/1974 | Lazarus | ............ | A61C 3/00 433/141 |
| 3,932,960 A * | 1/1976 | Edgar | ............ | B24B 5/355 451/5 |
| 4,052,015 A * | 10/1977 | Hand | ............ | B65H 67/048 242/474.5 |
| RE30,976 E * | 6/1982 | Wunder | ............ | B24B 41/005 451/163 |
| 4,410,053 A * | 10/1983 | Masse | ............ | E21B 4/14 175/53 |
| 4,502,552 A * | 3/1985 | Martini | ............ | E21B 17/07 175/321 |
| 4,538,945 A * | 9/1985 | Godecke | ............ | B23Q 27/006 29/57 |
| 4,540,033 A * | 9/1985 | Wehr | ............ | A01G 23/081 144/34.1 |
| 4,541,160 A * | 9/1985 | Roberts | ............ | F16C 1/02 29/401.1 |
| 4,872,362 A * | 10/1989 | Kemper | ............ | B23Q 5/326 74/490.04 |
| 5,100,271 A * | 3/1992 | Kameyama | ............ | B23Q 5/402 408/129 |
| 5,113,728 A * | 5/1992 | Medeksza | ............ | B23B 25/02 408/1 R |
| 5,216,933 A * | 6/1993 | Koji | ............ | B23Q 1/4857 74/479.01 |
| 5,305,556 A * | 4/1994 | Kopp | ............ | B06B 3/00 451/124 |
| 5,342,152 A * | 8/1994 | Medeksza | ............ | B23B 25/02 408/1 R |
| 5,517,190 A * | 5/1996 | Gunn | ............ | G01B 7/003 324/661 |
| RE35,372 E * | 11/1996 | Houben | ............ | B25D 11/062 173/109 |
| 5,626,474 A * | 5/1997 | Kukla | ............ | A61C 8/0089 433/141 |
| 5,649,451 A * | 7/1997 | Ruland | ............ | B23Q 1/4828 74/89.3 |
| 5,769,575 A * | 6/1998 | Stofflet | ............ | B23Q 1/015 408/129 |
| 6,035,515 A * | 3/2000 | Baer | ............ | B23P 19/00 29/505 |
| 6,463,824 B1* | 10/2002 | Prell | ............ | B23Q 5/045 173/29 |
| 7,566,193 B2* | 7/2009 | Haj-Fraj | ............ | B23Q 1/4876 409/216 |
| 8,381,834 B2* | 2/2013 | Barhitte | ............ | B25F 5/00 173/164 |
| 9,327,375 B2* | 5/2016 | Yamane | ............ | B23Q 5/04 |
| 9,662,756 B2* | 5/2017 | Watford | ............ | B25F 5/001 |
| 10,066,715 B2* | 9/2018 | Larson | ............ | F16H 25/2015 |
| 2003/0075321 A1* | 4/2003 | Hall | ............ | E21B 17/1057 166/241.1 |
| 2005/0039617 A1* | 2/2005 | Kusaka | ............ | B41F 31/14 101/216 |
| 2005/0055041 A1* | 3/2005 | Woods | ............ | A61F 9/013 606/166 |
| 2005/0272543 A1* | 12/2005 | Seeber | ............ | B21J 13/12 474/133 |
| 2006/0165498 A1* | 7/2006 | Ramfjord | ............ | B24D 7/18 407/31 |
| 2009/0107308 A1 | 4/2009 | Woody et al. | | |
| 2009/0270896 A1* | 10/2009 | Sullivan | ............ | A61B 17/32002 606/170 |
| 2010/0003096 A1* | 1/2010 | Peigne | ............ | F16C 19/10 408/199 |
| 2011/0108600 A1* | 5/2011 | Pedicini | ............ | B25C 1/047 227/2 |
| 2012/0172889 A1* | 7/2012 | Chin | ............ | A61B 17/32002 606/119 |
| 2015/0283667 A1* | 10/2015 | Regler | ............ | B24B 33/105 451/11 |
| 2018/0274310 A1* | 9/2018 | Francis | ............ | B25B 21/002 |
| 2020/0305870 A1* | 10/2020 | Shelton, IV | ...... | A61B 17/07207 |

* cited by examiner

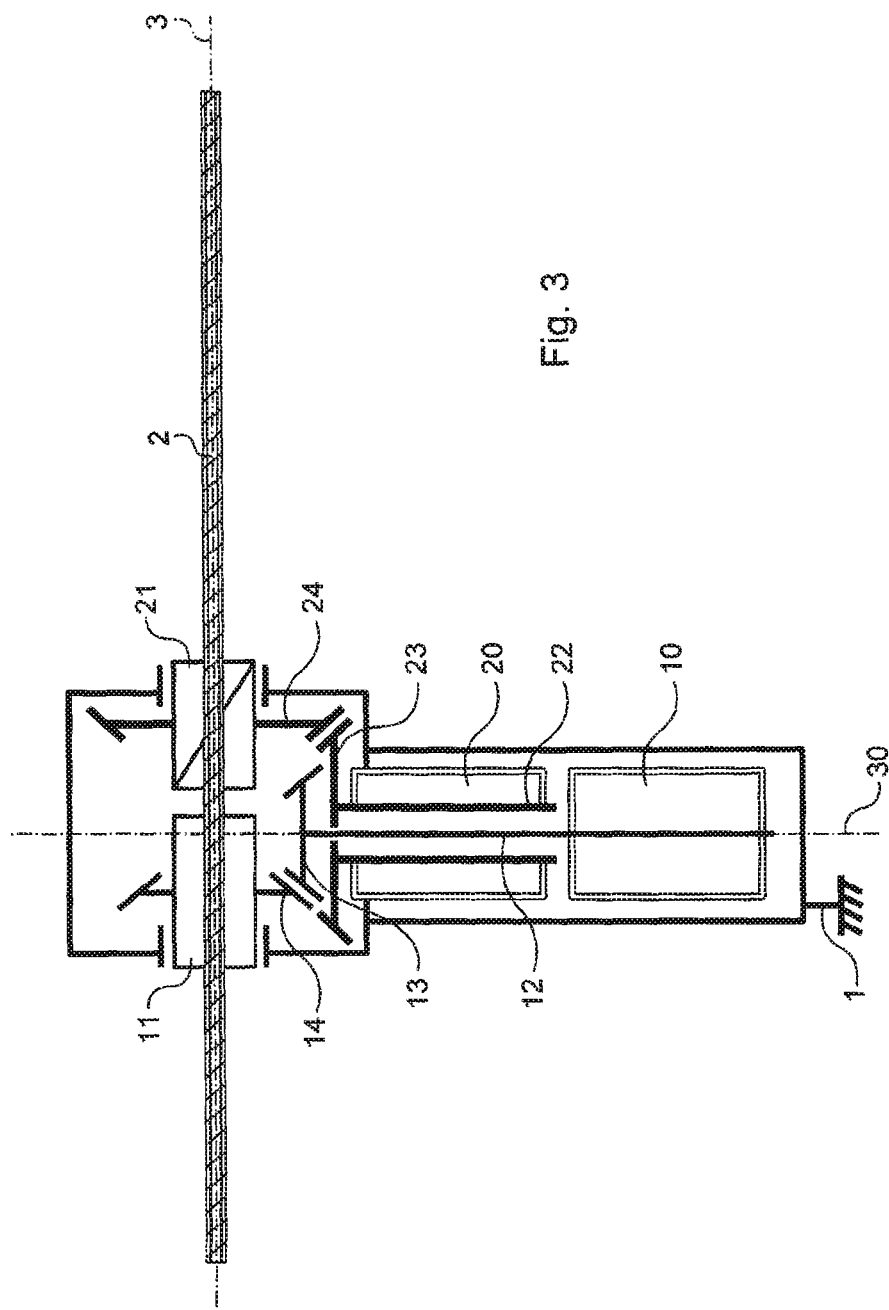

MACHINE TOOL, IN PARTICULAR FOR DRILLING

FIELD OF APPLICATION OF THE INVENTION

The present invention relates to the field of machine tools, which are in particular load-bearing, carrying out conventional aeronautical assembly operations, such as drilling and countersinking operations and, in particular, to modifications permitting these operations to be carried out in optimum conditions from an ergonomic, qualitative and productivity point of view.

DESCRIPTION OF THE PRIOR ART

A load-bearing drilling machine generally comprises a frame, a drive shaft of a tool being mounted therein so as to pivot about an axis of rotation and to move axially along the axis of rotation (forward or downward movement).

In the majority of embodiments, the machine comprises a single motor providing the motorization of the rotational movement and the forward movement of the shaft. Variable ratio transmission members which comprise, for example, gear mechanisms or pulley/belt assemblies, permit the speed of rotation and the axial speed of displacement of the tool to be appropriately adapted.

These machining tools are thus limited to torques due to rotational speed and forward speed, the ratios thereof being predefined. This may prove restricting in certain machining conditions for attaining optimum performance of the machine. Moreover, for these conventional configurations, the mass to be moved necessitates resorting to relatively bulky motors.

In machining tools designed for workshop use, the shaft is generally mounted solely to pivot on a head which is mounted on the frame for sliding in the downward direction. The structure of these machines is relatively complex and bulky.

Some configurations of machines of this type propose the addition of axial oscillations to a forward movement at constant speed, in order to improve chip removal by means of chip fragmentation. There are several systems, principally based on different generating mechanisms, using special bearings, variable-ratio gears on a lathe or piezoelectric actuators. The principles based on mechanical solutions are characterized by the fact that the amplitude of the oscillations is either fixed (predefined by the design) or may be changed, but with difficulty, outside the machining process. Whatever the case, the frequency of these oscillations per se is always associated by a fixed ratio to the speed of rotation (number of oscillations per revolution, fixed at the design stage).

The system disclosed by the document GB 2218268 is also present in the prior art, said system proposing a thread tapping device which comprises two coaxial motors driving a spindle via a sliding connection and in translation via a helicoidal connection.

A virtually equivalent device is disclosed in the document U.S. Pat. No. 5,649,451 which to a certain extent complements the teaching of the preceding document in that it relates to the superposition of means for producing a sliding connection and a helicoidal connection on the same section of shaft.

However, these devices remain quite inefficient.

SUBJECT OF THE INVENTION

Proceeding therefrom, the applicant has carried out research with the purpose of proposing an electrically powered machine tool, capable of carrying out the conventional operations of drilling and countersinking by combining the functional assemblies which enables them to be used whilst respecting the restrictions of space requirement, compactness, rigidity and mass necessary for a use implementing these operations in optimum conditions, preferably in a single pass with a level of quality usually required, for example, in the aeronautical industry.

The applicant has also attempted to improve the control of speed, acceleration and jerks when the different operations are carried out.

BRIEF DESCRIPTION OF THE INVENTION

To this end, according to the invention a machining tool is provided, said machining tool comprising a frame, a drive shaft of a tool being mounted therein so as to rotate pivot about an axis of rotation and to move axially along the axis of rotation. The shaft is connected to two rotary motors, namely a first motor connected to a member for meshing with a fluted section of the shaft in order to drive the shaft in rotation and a second motor connected to a nut engaged on a threaded section of the shaft in order to move the shaft axially. The first motor and the second motor are coaxial with one another and connected to a control unit connected to position sensors of the rotors of the motors and designed to control the motors so as to produce an axial displacement of the drive shaft at constant speed and to superpose onto this axial displacement axial oscillations having an amplitude and a frequency capable of chip fragmentation, the control unit being designed to permit a modification in real time of the amplitude and of the frequency of the oscillations thereof.

This mechanical architecture coupled to a control unit which is connected to position sensors of the rotors of the motors permits the angular position and the electrical parameters of the two motors to be determined in real time and in a synchronized manner, and independently of one another. This makes it possible to control these two motors, dependent on one another, in particular to superpose onto the axial displacement of the drive shaft, at constant speed, axial oscillations having an amplitude and frequency capable of chip fragmentation, with the possibility of modifying, in real time during the machining process, the amplitude and the frequency of the oscillations.

The control unit and the position sensors of the rotors of the motors make it possible to detect independently, and at any moment, the position and the speed of each of the two motors and to control the motors as a result. The speed of rotation and the speed of axial displacement are able to be controlled independently of one another by means of each motor, the coaxial arrangement thereof ensuring a relative compactness of the machine.

Further features and advantages of the invention will be disclosed from reading the following description of particular non-limiting embodiments of the invention.

BRIEF DESCRIPTION OF THE DRAWINGS

Reference will now be made to the accompanying drawings, in which:

FIG. 3 is a view similar to FIG. 1 of a machine according to a second embodiment of the invention.

DETAILED DISCUSSION OF THE PREFERRED EMBODIMENTS

Figure 1:
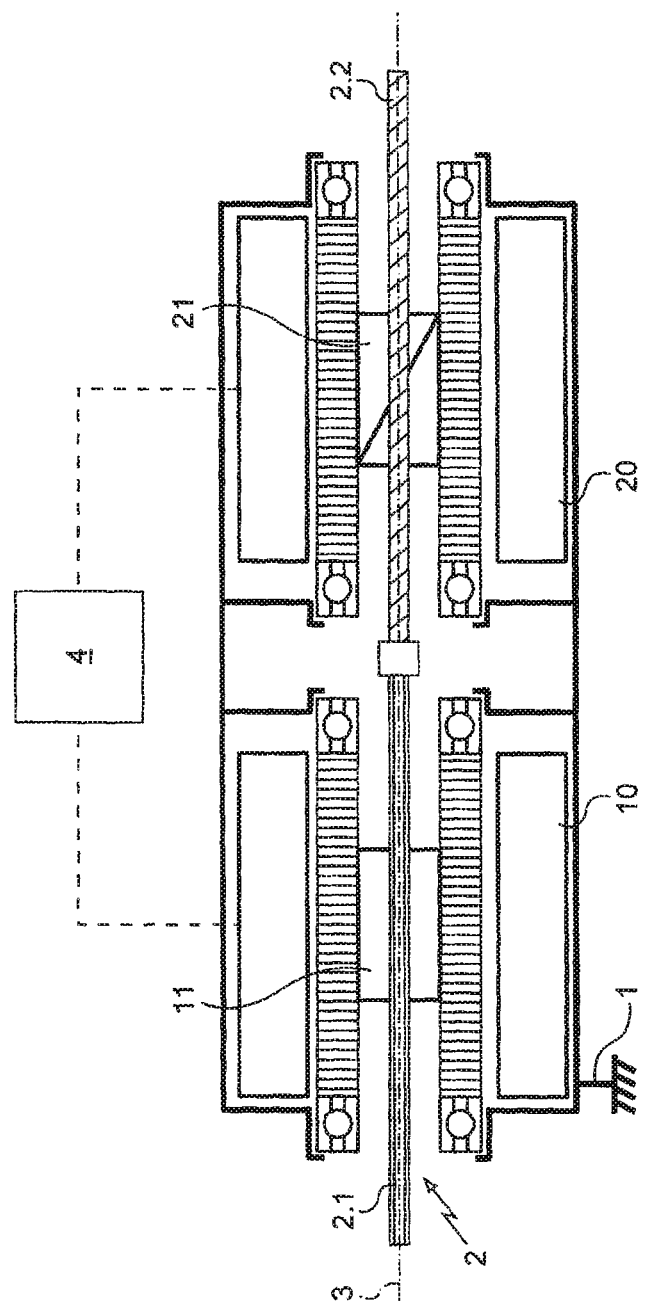
FIG. 1 is a partial schematic view in axial section of a machine according to a first embodiment of the invention.

With reference to the figures, the invention is disclosed here in an application to a tool for machining parts and in this case more particularly for drilling and countersinking.

The machine comprises a frame 1 which is only shown partially here. The frame 1 comprises, in the manner known per se, a load-bearing structure for resting on the ground and a table, the part to be machined being designed to be fixed thereto, for example by means of a machining assembly.

A drive shaft 2 of a tool is mounted in the frame so as to have one end which extends in the vicinity of the table and which is provided with means for fixing the tool. These means for fixing are known per se. The tool is mounted, for example, at one end of the drive shaft by a screw/nut connection.

The shaft 2 is mounted so as to rotate pivot about an axis of rotation 3 and to be displaced axially along the axis of rotation 3.

The shaft 2 is connected to two electric rotary motors, namely a first motor 10 for the driving in rotation and a second motor 20 for the axial displacement. More specifically, the motor 10 has a rotor fixed in rotation to a coupling member 11 which is designed to be in sliding connection with a fluted section 2.1 of the shaft 2 to drive the shaft in rotation. The coupling member 11 is, for example, an internally fluted sleeve. The motor 20 has a rotor fixed in terms of rotation to a nut 21 engaged on a threaded section 2.2 of the shaft 2, thus forming a helicoidal connection to displace the shaft 2 axially when a relative speed is imposed between the coupling member 11 and the nut 21, i.e. when the two elements are rotated at different speeds. Advantageously, as the tool is at least partially helicoidal in shape, in this case a drill bit, the helicoidal connection and the tool have pitches in the same direction.

The motor 10 and the motor 20 are coaxial with one another which permits a more compact structure to be obtained than the existing configurations and the inertia to be minimized and the motors are connected to at least one control unit, symbolized by 4, designed to control the motors.

With reference more particularly to FIG. 1, and according to the first embodiment of the invention, the shaft is arranged so that the fluted section 2.1 and the threaded section 2.2 are separate and are arranged in succession along the axis of rotation. The two sections here are connected together by a connecting sleeve fixed to the respective adjacent ends of the fluted section 2.1 and the threaded section 2.2. The path of the tool is thus limited to a length which is equal to the distance between the coupling member 11 and the nut 21, minus the length of the connecting sleeve.

The motor 10 and the motor 20 are coaxial with the shaft 2 and are passed through by the shaft: the motor 10, and more particularly the rotor thereof, extends around a portion of the fluted section 2.1 and the motor 20, more particularly the rotor thereof, extends around a portion of the threaded section 2.2

The use of two independent motors permits a machine which has a reduced space requirement and mass. The machine is thus able to be designed to be load-bearing or mounted on a robot arm.

The machine also comprises two position sensors of the rotors of the motors 10, 20. These sensors are in this case angular, more particularly magnetic, encoders composed of two separate parts, namely a high precision magnetic ring associated with a reading head of the contactless type. The rings are connected in rotation to the rotors of the motors and the reading heads are fixed to the stators. The sensors are connected to the control unit 4. The magnetic rings and the reading heads are, for example, those of the LR and MR series sold by RLS.

The very rigid mechanical arrangement of the shafts and the motors with the two position sensors makes it possible to act upon the control of the motors in an accurate manner and in real time. To this end, the control unit uses a trajectory feedforward loop or a feedback loop, or even both. The control unit is designed to control the motors 10 and 20 to adapt, preferably in real time, the axial displacement and/or the rotational movement as a function of the machining conditions. The machining conditions (speed of rotation and speed of travel) are determined in real time and continuously by measuring the positions and speeds of the two shafts: in the case of a discrepancy with the machining reference values, the control unit makes an adjustment on one of the axes or even on the two axes to attain the machining reference values.

The control unit may advantageously be programmed to control the motors 10 and 20 so as to cause an oscillation of the tool, in particular in the axial direction thereof. This results in the formation of vibrations which improve the efficiency of the drilling. The control unit is advantageously arranged so as to permit a modification in real time of the parameters of the oscillations (amplitude and frequency of the oscillations). According to a first example of machining a part of the same material, the machining conditions (amplitude and frequency of the oscillations) are determined in real time and continuously by measuring the positions and speeds of the shaft relative to two axes (angular position and speed, linear position and speed): in the case of a discrepancy with the machining reference values favorable to chip fragmentation in the material, the control unit makes an adjustment on one of the axes or even on both axes in order to attain the reference values. In a second example of machining a part consisting of two materials arranged in succession and having different behavior in terms of chip formation, it is desirable to modify the machining conditions when the material changes in order to continue with the chip fragmentation. To achieve this, the control unit changes the control parameters of the motors to adapt said parameters in an optimum manner to the relevant material. This change is carried out either by programming, taking into account the linear position of the shaft on the feed axis (from the position of the two axes in real time during the entire process and taking into account the relative position of the two materials in the part to be machined) or by detecting and processing motor currents (increase or reduction of cutting force as a function of the physical properties of the two materials) which will determine the change of machining conditions.

More specifically, the control unit is designed to control the axial displacement of the drive shaft according to at least one of the following means:
   axial displacement at constant speed;
   axial displacement with oscillations superposed at a constant value.

The oscillations, for example, have a sinusoidal waveform or the like, defined to promote chip fragmentation.

The control unit is also designed to determine the electrical parameters of the motors and to determine the machining conditions from these parameters. The determination is carried out, for example, by measurement or computation.

The machining conditions are, for example, deduced from the torque provided by the motors based on the supply current thereof. It is thus not necessary to resort to external sensors even if this is conceivable in order to increase the functionalities of the machine.

The control unit is further designed to determine and compare the speeds of the motors: if, when a forward movement of the tool is initiated during machining, the two motors start to rotate at the same speed, the control unit signals a breakage of the tool (since in this case the tool is no longer able to move forward).

The control unit is designed to determine the electrical parameters of the motors and to deduce therefrom the effective position of the part to be machined. To achieve this, the currents of the two motors are measured and mathematically processed in real time to link the increase in these currents with the axial position of the cutting tool. More specifically, when the cutting tool encounters the part to be machined, the force resisting the movement of the tool increases and causes an increase in the current required for supplying the motors in order to maintain the movement of the cutting tool.

When the tool is mounted at one end of the drive shaft by a screw/nut connection, the control unit is designed to control the motors when the tool is changed, in order to ensure the mounting or the dismantling of the tool relative to the drive shaft 2.

Figure 2:
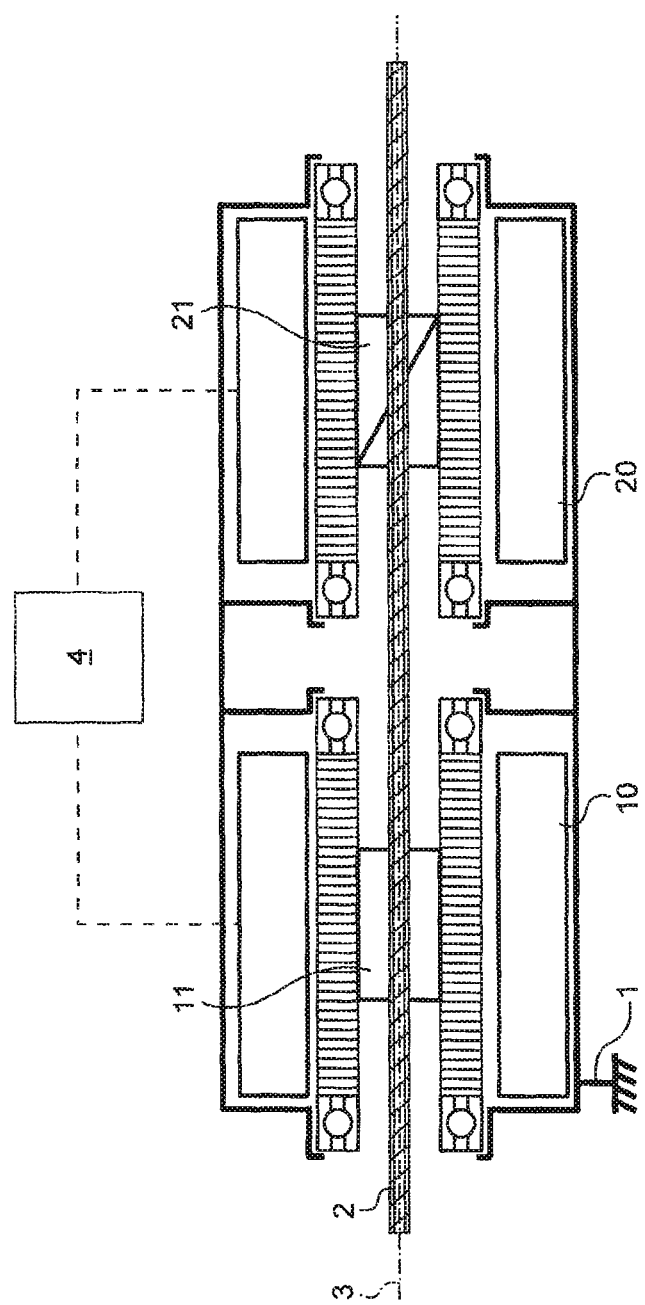
FIG. 2 is a view similar to FIG. 1 of a machine according to a variant of the first embodiment.

In the variant of FIG. 2, the fluted section and the threaded section extend at least partially over a common length of the shaft and more specifically in this case over the entire length of the shaft 2.

The remainder of the machine is identical to that which has been described above relative to FIG. 1.

The path of the tool is thus limited in this case to the length of the shaft 2, minus the distance between the opposing ends of the coupling member 11 and of the nut 21. Elements which are identical or similar to those described above bear the same reference numeral to those in the following description of the second embodiment with reference to FIG. 3.

In this embodiment, the motors 10 and 20 are no longer coaxial with the shaft 2 but remain coaxial to one another along an axis 30 which is inclined relative to the axis of rotation 2. The axis 30 in this case is more specifically perpendicular to the axis 2 in the particular embodiment shown.

The rotor of the motor 10 drives an output shaft 12 driving a conical toothed wheel 13 meshing with a conical toothed wheel 14, the coupling member 11 which is engaged on the flutes of the shaft 2 being fixed thereto in terms of rotation.

The rotor of the motor 20 in this case has the shape of a tubular shaft 22 which extends coaxially around the output shaft 12. The rotor of the motor 10 drives a conical toothed wheel 23 meshing with a conical toothed wheel 24, the nut 21 which is engaged on the thread of the shaft 2 being fixed thereto in terms of rotation.

Naturally, the invention is not limited to the embodiments described but encompasses any variant falling within the scope of the invention as defined by the claims.

In particular, the shaft may have a different structure from that described: the threaded section and the fluted section may be made of the same material or attached to one another.

The sliding connection may be obtained by other means than those described and, in particular, a prismatic shaft slidably received in a housing of complementary shape formed in the coupling element.

The shaft may be indirectly connected to the tool at one or other of its ends.

Only the parts of the machine relating to the invention have been described: the machine may also comprise, in particular, means for lubrication in the center of the tool, means for changing the tool, means for loading and unloading parts to be machined, etc.

The invention may be applied to a different type of machining tool from drilling machines and, for example, milling machines.

As a variant, the helicoidal connection and the tool have pitches in opposing directions, so as to facilitate the implementation of a rapid return cycle of the tool.

Further sensors or means for detection from those mentioned are able to be used and, in particular, optical encoders.

The invention claimed is:

1. A machining tool comprising a drive shaft of a tool extending along an axis, a first motor connected to a coupling member which is in sliding connection with a first section of the shaft in order to drive the shaft in rotation about the axis and a second motor connected to a nut which is in helicoidal connection with a second section of the shaft in order to move axially the shaft along the axis, the first motor and the second motor being coaxial with one another and connected to a control unit connected to position sensors of rotors of the first motor and second motor, the control unit controlling the first motor and second motor so as to produce an axial displacement at constant speed of the drive shaft and to superpose onto this axial displacement axial oscillations having an amplitude and a frequency adapted for chip fragmentation, the control unit permitting a modification in real time of the amplitude and the frequency of the axial oscillations independently of the drive shaft rotation about the axis.

2. The machine as claimed in claim 1, wherein the oscillations have a waveform which is sinusoidal, trapezoidal, saw-tooth-shaped, etc.

3. The machine as claimed in claim 1, wherein the control unit determines the electrical parameters of the motors and determines the machining conditions from these parameters.

4. The machine as claimed in claim 1, wherein the control unit determines the electrical parameters of the motors and deduces therefrom the effective position of the part to be machined.

5. The machine as claimed in claim 1, wherein the control unit determines and compares the speeds of the motors to detect a fault in the machine or the cutting tool.

6. The machine as claimed in claim 1, wherein since the tool has a shape which is at least partially helicoidal, the helicoidal connection and the tool have pitches in opposing directions, so as to reduce the time to implement a return cycle of the tool.

7. The machine as claimed in claim 1, wherein the control unit modifies the oscillations as a function of the machining conditions determined in real time and continuously by measuring the angular and linear positions and the angular and linear speeds of the shaft: in the case of a discrepancy with predetermined machining reference values which are favorable to chip fragmentation, the control unit controls the motors to make an adjustment for the discrepancy.

8. The machine as claimed in claim 1, for the machining of a part consisting of two different materials arranged in succession, wherein the control unit modifies the oscillations when the material changes, in order to continue with the chip fragmentation by changing the control parameters of the motors in order to adapt said parameters in an optimum manner to the machined material.

9. The machine as claimed in claim 1, wherein a change is carried out by programming, taking into account the angular and linear positions of the shaft and the relative position of the two materials in the part to be machined.

10. The machine as claimed in claim 1, wherein a change is carried out by detecting and processing motor currents to cause the change of control parameters, as a function of an increase or reduction in the motor currents representing an increase or reduction in the cutting force.

11. A machining tool comprising a drive shaft of a tool extending along an axis, a first motor connected to a coupling member which is in sliding connection with a first section of the shaft in order to drive the shaft in rotation about the axis and a second motor connected to a nut which is in helicoidal connection with a second section of the shaft in order to move axially the shaft along the axis, the first motor and the second motor being
 coaxial with one another and connected to a control unit connected to position sensors of rotors of the first motor and second motor, the control unit being programmed to control the first motor and second motor so as to produce an axial displacement at constant speed of the drive shaft and to superpose onto this axial displacement axial oscillations having an amplitude and a frequency adapted for chip fragmentation, the control unit permitting a modification in real time of the amplitude and the frequency of the axial oscillations independently of the drive shaft rotation about the axis.

12. A machining tool comprising a drive shaft of a tool extending along an axis, a first motor connected to a coupling member which is in sliding connection with a first section of the shaft in order to drive the shaft in rotation about the axis and a second motor connected to a nut which is in helicoidal connection with a second section of the shaft in order to move axially the shaft along the axis, the first motor and the second motor being coaxial with one another and connected to a control unit connected to position sensors of rotors of the first motor and second motor, the control unit determining in real time and a synchronized manner an angular position and electrical parameters enabling the control unit to control the first motor and second motor so as to produce an axial displacement at constant speed of the drive shaft and to superpose onto this axial displacement axial oscillations having an amplitude and a frequency adapted for chip fragmentation, the control unit permitting a modification in real time of the amplitude and the frequency of the axial oscillations independently of the drive shaft rotation about the axis.

13. The machine tool according to claim 11, wherein the control unit determines in real time and a synchronized manner an angular position and electrical parameters enabling the control unit to control the first motor and the second motor.

* * * * *